UNITED STATES PATENT OFFICE.

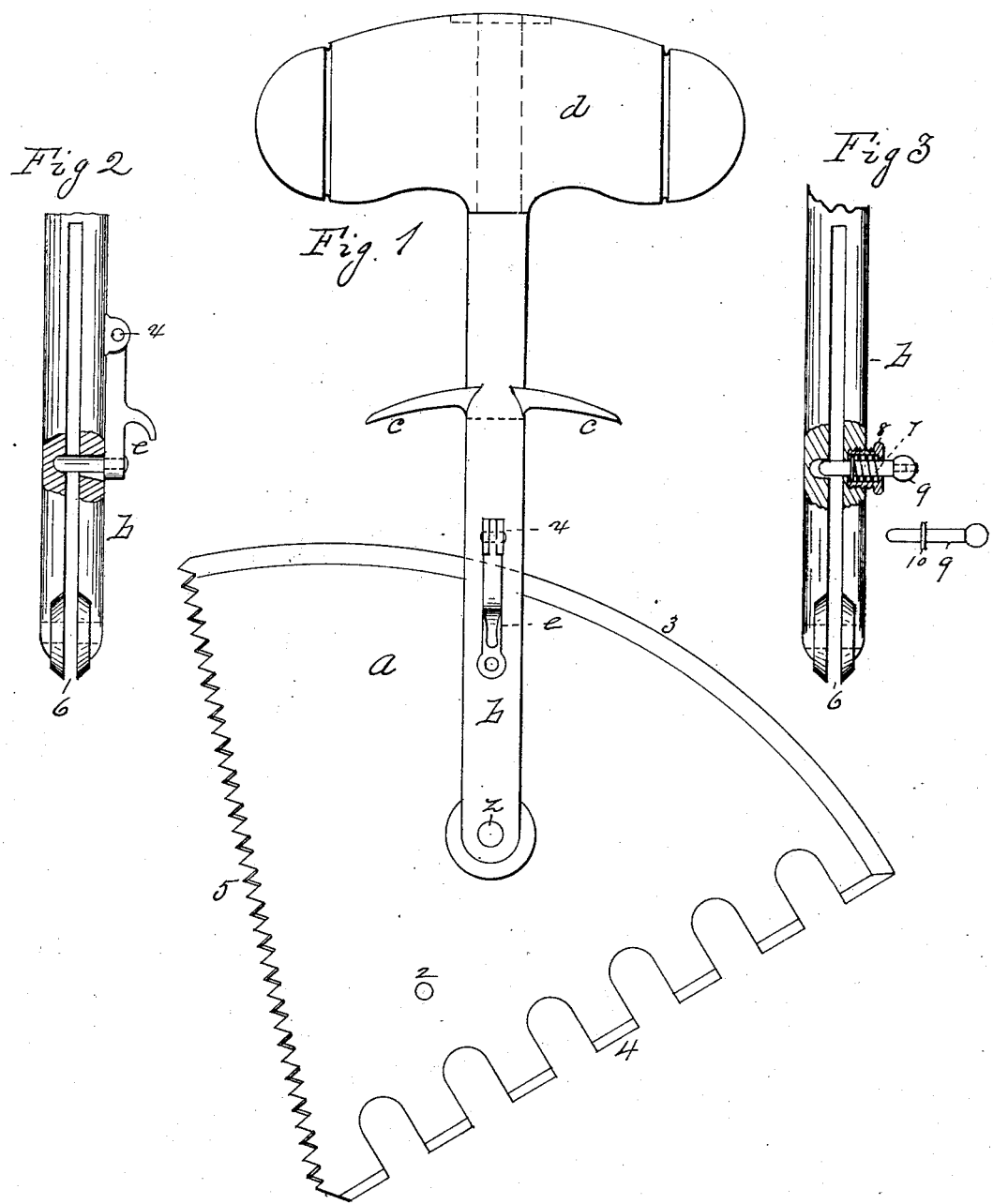

JOSHUA C. STODDARD, OF SPRINGFIELD, MASSACHUSETTS, ASSIGNOR TO O. W. BULLOCK, OF SAME PLACE.

COMPOUND TOOL.

SPECIFICATION forming part of Letters Patent No. 363,561, dated May 24, 1887.

Application filed February 21, 1887. Serial No. 228,298. (No model.)

*To all whom it may concern:*

Be it known that I, JOSHUA C. STODDARD, a citizen of the United States, residing at Springfield, in the county of Hampden and State of Massachusetts, have invented new and useful Improvements in Compound Tools, of which the following is a specification.

This invention relates to an improved compound tool, the object being to provide an implement for domestic use combining in its construction a chopping-knife, a saw, and a meat-tenderer, all so arranged upon one blade that either one is, when needed, brought into proper position for use.

In the drawings forming part of this specification, Figure 1 is a side elevation of a compound tool constructed according to my invention. Fig. 2 is an edge view of the lower part of the handle-bar, partly broken away to show the stop-pin. Fig. 3 is a similar view to Fig. 2, but showing a modified construction of the stop-pin and a side view of the latter separate from the handle-bar.

In the drawings, $a$ is a blade, made preferably of steel, of the usual thickness of a chopping-knife or a saw-blade, its edge being divided into three sections, whereby the said blade in plan view, as in Fig. 1, has the form, substantially, of an equilateral triangle, one of whose sides, 3, has a knife-edge suitably curved to serve as a chopping-knife, another of its sides, 5, being straight and having saw-teeth formed thereon, and its third side, 4, being also straight, and having formed thereon a series of meat-tendering teeth, as shown, whose edges are properly sharpened, thereby constituting a series of short chisel ends in a line. The said blade $a$ is perforated centrally to permit of passing a pin or rivet, $z$, through it and through the end of the handle-bar, to attach the blade to the latter and to form a pivot on which the blade rotates. Other perforations, 2, are made in the blade $a$, in which a stop-pin attached to the handle-bar engages, as hereinafter described.

The handle-bar $b$ is provided with the usual handle, $d$, and a little below the latter are formed the guards $c$ thereon, and its lower end is slotted longitudinally, forming the slot 6 therein, and, as heretofore mentioned, is perforated to receive the pin $z$. A boss is formed on the side of the bar $b$, in which is pivoted, by the pin $x$, the vibrating blade-stop $e$, having a pin thereon entering a cavity in the side of the bar and extending across the slot 6 therein. The bar $b$ is made of suitable metal, and is either cast or forged, as may be most convenient, and the slot 6 therein is of sufficient length to permit of turning the blade $a$ in the bar to bring either of the said edges 3, 4, or 5 into operative position. As aforesaid, the blade $a$ is pivoted in the slot 6 of the bar $b$ by the pin $z$, and is held rigidly in a working position in the bar by the stop $e$, the pin thereon entering one of the holes 2. The position of the blade shown in Fig. 1 is that in which it is used for sawing and for operating the tendering-edge 4. When the hole 2, which is exposed to view in the drawings, is turned under the pin on the stop $e$ on the bar, the chopping-knife edge 3 is brought opposite the handle $d$ and into operative position.

A finger-hook is formed on the stop $e$, for convenience in operating the latter.

The guards $c$ $c$, projecting at right angles from the bar $b$ below the handle $d$, serve to prevent the hand of the operator from accidentally coming in contact with the edge of the blade $a$.

In Fig. 3 is shown a modified construction of the stop-pin shown in Fig. 2. In Fig. 3 the pivoted piece $e$ is dispensed with, and the pin 9, having the collar 10 therein, is placed in a screw-threaded socket in the bar $b$, its head is removed, the spiral spring 7 is placed on pin 9, the hollow nut 8 is placed over the pin and screwed into the said socket in the bar, and the head of the pin is replaced and suitably secured thereon.

In the above-described construction the spring 7 is compressed between nut 8 and collar 10 on the pin, thus tending to push the latter across the slot 6 in the bar $b$ and into one of holes 2 in the blade when one is brought under the pin, and the latter is drawn outwardly by grasping its head.

What I claim as my invention is—

An improved compound tool consisting of a metallic blade, substantially as described, having formed on its edges a chopping-knife, a saw, and a meat-tenderer, a slotted handle-bar, in which said blade is pivoted to rotate, and a suitable stop-pin passing through said bar and blade, whereby the latter is retained in its several operative positions, combined and operating substantially as set forth.

JOSHUA C. STODDARD.

Witnesses:
H. A. CHAPIN,
G. M. CHAMBERLAIN.